Feb. 27, 1968
G. MARTIN
3,370,343
METHOD OF CLEANING AND FLUXLESS BRAZING
OF ALUMINUM AND ALUMINUM ALLOYS
Filed March 17, 1965
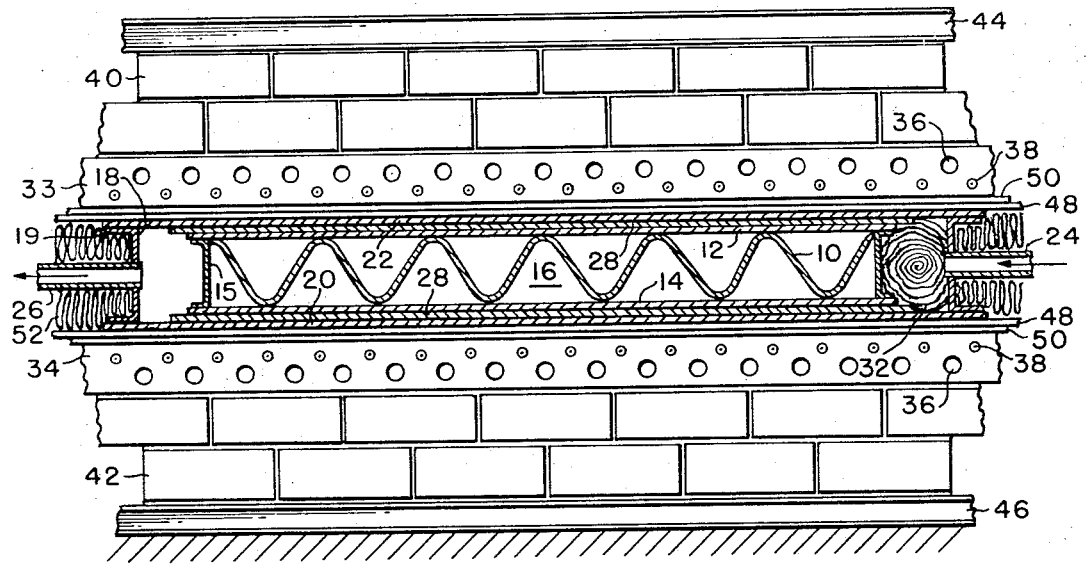
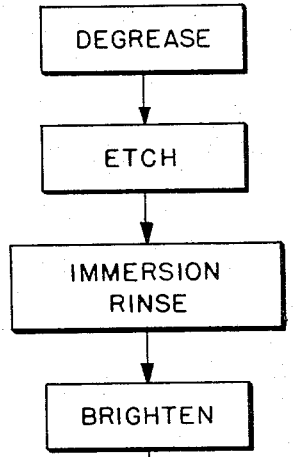
Fig 1
ALUMINUM CLEANING PROCESS
DEGREASE → ETCH → IMMERSION RINSE → BRIGHTEN → IMMERSION RINSE → SPRAY RINSE → DRY
Fig 2
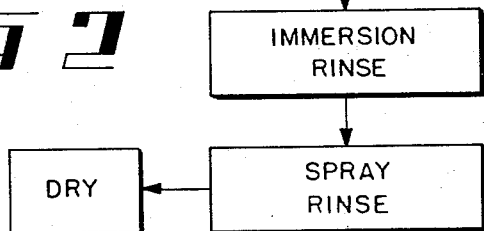
INVENTOR.
GEOFFREY MARTIN
BY
ATTORNEYS.

United States Patent Office 3,370,343
Patented Feb. 27, 1968

3,370,343
METHOD OF CLEANING AND FLUXLESS
BRAZING OF ALUMINUM AND ALUMI-
NUM ALLOYS
Geoffrey Martin, Nashville, Tenn., assignor to Avco Corporation, Nashville, Tenn., a corporation of Delaware
Filed Mar. 17, 1965, Ser. No. 440,551
2 Claims. (Cl. 29—494)

ABSTRACT OF THE DISCLOSURE

The disclosed method comprises a rigorous series of steps for removing aluminum oxide from the surface of aluminum or aluminum alloy components prior to brazing in an inert atmosphere without the use of fluxes.

This invention relates to a method for fluxless brazing of aluminum and aluminum alloys.

The characteristics of aluminum to form a protective oxide film in the presence of air is one of the prime factors dictating metal preparation and brazing techniques. This metal oxide film, essentially amorphous aluminum oxide of a very small thickness, must be removed at least to a degree permitting atomic interdiffusion of the component metals to accomplish satisfactory joining. While the aluminum oxide film can be removed with special fluxes during the brazing cycle, this method is unsatisfactory for brazing of sandwich-type composites because of the entrapment of the corrosive flux compositions. Nor can thermochemical reduction of the oxide in a hydrogen brazing atmosphere be accomplished because of brazing temperature restrictions. Thus, mechanical or chemical methods of the oxide removal are the remaining feasible recourses. Strongly acid or alkaline solutions are usually effective in dissolving the oxide film. This invention utilizes acid chemical reactances and processing techniques for oxide removal and then maintains a controlled atmosphere up to and during the brazing cycle to prevent other than limited oxide formations. The acid cleaning of the various parts going in to make up a composite follows a meticulous prefitting operation conducted under conditions of "clean" room environmental control.

The most commonly used methods for brazing aluminum are: torch brazing in which heat is applied by means of a torch; furnace brazing, in which the assemblies to be brazed are heated in a furnace; and dip brazing in which the entire assembly is immersed in a molten flux bath. All of these known prior art methods of brazing require the use of a flux for removing oxide films to assure complete penetration of the filler material into the brazed joints. Since complete removal of the fluxes is not feasible in many cases, and since there is always the possibility of flux entrapment within the brazed joints, this invention provides an effective brazing method without the use of flux.

To braze aluminum or aluminum alloys requires the use of a filler material which may be in the form of a foil, wire, shims, powder, paste, etc., or the joint surface of the parent or base metal may be clad with a layer of the filler material prior to pre-brazing assembly. The particular filler material must be selected so that its melting point is below the melting point of the parent metal. Commercially available filler metals for brazing aluminum are aluminum alloys containing silicon or silicon and copper. Most of these filler materials melt over a wide temperature range; for example, with Type Al–7.5% Si filler, the variation may be as much as 115° between solidus and liquidus, while Type Al–12% Si filler material has a 10° F. melting range.

Fluxes required for brazing contain fluorides and chlorides which, when sufficiently heat energized, go into a chemical reaction with the aluminum oxide. The residues of these salts are extremely corrosive and therefore require complete removal. The major portion of the flux can in some instances be removed by immersing the parts in boiling water before they cool completely from brazing temperature. This method, however, sometimes results in distortion of the parts, and therefore cannot always be used. This method is then followed by the use of acid solutions used to remove residual brazing flux. However, the residue from these acids must be completely washed off and the parts thoroughly dried, and particular pains must be taken so that absolutely no moisture is retained in interior spaces. It is apparent, therefore, that where a joint is enclosed, for example as encountered in a honeycomb sandwich structure fluxed brazing processes are not suitable because of the lack of a method for insuring a corrosion-free brazement. Furthermore, refluxed brazing requires the flux to flow over the joint surfaces, which in any case may result in flux entrapment below the joint surface, such that the corrosive salts are completely enclosed in the base and filler metals.

In the course of researching the problem of joining aluminum by brazing without an oxide reducing flux, several factors were considered. Magnesium, aluminum, and silicon fall in the third period of the periodic table of the elements, and these elements are classified as active substances. The element silicon usually exhibits a covalence of 4 and its oxidation numbers range from —4 to 4. The oxidation state or potential of silicon depends upon the extent to which its valence electrons are shared with other silicon atoms. Silicon is frequently used as a deoxidizer in the starting process of some metals. Aluminum is one number above silicon in the third main level of the period tables, having an electron distribution of three, two in level $3_0$ and one in level $3_1$. Aluminum forms a number of covalent compounds in which its oxidation number is 3. Aluminum and silicon do not form compounds, neither does silicon have any substantial solubility in aluminum. Thus, in an alloy of aluminum and silicon and/or magnesium, the alloying element or elements are mostly migratory atoms.

It was proved that aluminum and its alloys had differences in oxide formation rates and therefore differed in their inertness levels under certain conditions. The 3003 aluminum, which comprises 98.8% Al 1.2% Mn, is considerably more inert than other aluminum alloys containing less aluminum. In fluxless brazing 3003 aluminum, the allowable time between oxide removal and braze is considerably less than that for the 6061 alloy. However, if the lapsed time is the same for these two alloys, then the brazing heat and/or time at braze must be increased for the 3003 alloy in order to overcome the oxide inert surface. This says, in effect, that the filler metal must do more work at the surface of the 3003 alloy than at the surface of the 6061 alloy. This is accomplished by applying a greater total heat energy to the filler metal.

In evaluating fluxless brazed joints of parent metal aluminum joined with aluminum and silicon and also aluminum-magnesium-silicon-zinc, and copper, the joint exhibits a complete metallurgical structure in which total interface diffusion is evident without any trace of oxide film demarcation, yet prior to brazing a mild oxide film did exist. The theory established is that certain braze filler metals exhibit a mild deoxidizing power, and that if the aluminum oxide film is held to levels less than that of a complete non-corrosive film, then magnesium and other substances will, when sufficiently energized by heat, deoxidize an aluminum oxide sufficient to allow interdiffusion. Prior to the discovery of fluxless aluminum brazing, the industry at large had concluded that non-metal chlorine or fluorine base fluxes were necessary to reduce the aluminum surface to a brazable state.

In accordance with the principles of this invention, aluminum brazing is accomplished without the use of fluxes. In general, the present fluxless brazing method includes the following steps: (1) a novel acid-cleaning process for removing aluminum oxide from the surface of the aluminum, this process including an aluminum brightener step; (2) providing a protective atmosphere for the cleaned aluminum to insure against the formation of undesirable aluminum oxides subsequent to cleaning and during brazing; (3) the application and control of appropriate brazing joint contact pressures and critical temperatures during brazing.

The brazing cycle and techniques used in accordance with this invention must be pre-established for each material system and part configuration to determine the temperature-pressure-time relationships. When commercial filler metals are used for brazing, brazing temperature must be reached with a minimum of temperature variation throughout the work package since these fillers have melting points very close to melting points of parent aluminum. For that reason, the tooling described in the copending application of Martin et al., Ser. No. 114,787, filed June 5, 1961, now Patent No. 3,263,007 dated July 26, 1966, is particularly useful in performing the processes of this invention. Experience has shown that a brazing temperature tolerance of $\pm 5$ to $10°$ F. is possible with said tooling depending on the size of the work packages. Time at brazing cycle is minimized and predetermined to prevent unnecessary interdiffusion of filler and parent metal. Moreover, the described tooling permits the application of extremely critical pressure at the joining temperature. Only slight pressure is necessary because of the relatively low strength of the metal components at brazing temperature. The same tooling also permits cooling from brazing temperature with minimum temperature variation within the brazed package to produce optimum dimensional control.

It is an object of this invention to provide a process for brazing aluminum without the use of fluxes for cleaning the aluminum oxide from the surface of the aluminum.

Another object of this invention is to provide a method for fluxless brazing of aluminum which involves the steps of cleaning the aluminum oxide from the surface of the aluminum to be brazed, maintaining a controlled atmosphere essentially free of oxygen for the aluminum surfaces subsequent to cleaning and during brazing, and applying controlled heat and pressure to the surfaces to be brazed.

Another object of this invention is to provide a method for fluxless brazing of aluminum which includes the steps of cleaning the aluminum surfaces of aluminum oxide films, enclosing the aluminum parts to be brazed in an enclosure having a flexible diaphragm wall in contact with the aluminum parts, purging the aluminum of all corrosive atmosphere with an inert gas, applying pressure to said diaphragm wall, and applying heat to the aluminum parts to be brazed.

Another object of this invention is to provide a novel method for removing oxides from aluminum and aluminum alloys.

For a better understanding of the invention and for further objects and advantages, reference should now be made to the following specification and to the accompanying drawings in which:

FIGURE 1 shows a composite aluminum structure in a brazing tool in accordance with this invention; and FIGURE 2 is a flow chart showing the steps of the aluminum cleaning process of this invention.

For the purpose of this specification the invention will be described in connection with the brazing of a honeycomb or corrugated core 10 to face sheets 12 and 14 to provide a composite sandwich structure, which is entirely enclosed by end walls 15. The invention may be used for brazing any joint, but is particularly useful when flux removal is not possible, as in this illustrative example where the brazements are inaccessible. The invention is not limited to the configuration shown, but can be used for brazing multiple core structures, and the composite structure may be contoured or have varied complex configurations by appropriately modifying the tooling configuration.

While not shown in the drawings, a brazing filler material is, of course, provided between the aluminum parts to be brazed. By way of example, the aluminum parts which I have brazed include the following alloy types: 1080F, 1100, 3003, 6061, 6951, and X7005. The filler materials used have been from the commercially available B–AlSi group in which the filler metals exhibit a melting point of at least 10–20° F. less than the melting point of the base or parent metals. The filler material may be in any form, such as foil, wire, powder, etc., but for the purposes of this disclosure, it will be assumed that the filler is clad to a surface of the face sheets 12 and 14, and is therefore integral therewith.

It is known that to braze the core 10 to the face sheets 12 and 14, all of the brazing surfaces must be free of aluminum oxides as well as pits, stains, or any other surface irregularity that would be detrimental to the brazing operation. For this purpose, all of the aluminum parts to be brazed must be cleaned. Unlike the prior art, the removal of oxides is accomplished here by cleaning prior to initiation of the brazing cycle.

First, the core 10 and face sheets 12 and 14 (which are clad with brazing filler) are degreased. With respect to the face sheets 12 and 14, this is accomplished by wiping with cheesecloth or equivalent, saturated, but not dripping, with Methyl-Ethyl-Ketone (MEK). Cleaning with MEK is continued until no discoloration is visible on a clean cloth. With respect to the core 10, degreasing is accomplished by vapor degreasing or by immersion in MEK. All the parts are dried at room temperature until the solvent has fully evaporated.

Next, all of the aluminum parts, the clad face sheets and the core, are immersed for 4 to 4½ minutes in a lead-lined steel tank containing a mildly agitated solution of sulfuric acid and tap water maintained at 150° F.±10°. The solution of sulfuric acid contains 35% ±3% by volume sulfuric acid and the balance tap water. A suitable sulfuric acid is technical grade, 66° Bé. Federal Specification O–S–809. This immersion constitutes an etching step.

The length of time required for the sulfuric acid etch of a particular aluminum alloy, or for determining whether or not a particular alloy is free of oxides, can be determined by visual inspection of samples immersed in the sulfuric acid. Since there is an apparent inactivity of aluminum towards acid or base due to the inert film of aluminum oxide present on the aluminum surface, there will be no visible reaction in the acid bath until the aluminum oxide is removed. When this occurs, a violent reaction with the release of hydrogen is clearly visible, and the sulfuric acid etch may be discontinued. In most cases this occurred in 4 to 4½ minutes.

After etching, but before the sulfuric acid solution is permitted to dry on the aluminum parts, the parts are immediately immersed in a stainless steel tank containing overflowing tap water at ambient temperature for 1 to 2 minutes.

Next, the aluminum parts are immersed for approximately 1 minute in a stainless steel tank containing a mildly agitated solution of nitric acid and tap water maintained at ambient temperature. The nitric acid solution contained 50%±3% by volume, 42° Bé. Federal Specification O–A–88, and the balance tap water. This is a brightener step, and it serves to remove from the parts the aluminum sulfate film resulting from etching in the sulfuric acid bath. Again care should be used in transferring to the nitric acid to assure that the aluminum surface remains wet, as any dry spots that form will tend to oxidize in the air and not be removed in the nitric acid, and prevent brightening in those areas.

Next, the parts are immersed in a stainless steel tank containing overflowing tap water at ambient temperature for 1 to 2 minutes immediately after removal from the nitric acid conditioning. This immersion is accomplished before the nitric acid solution is permitted to dry on the parts. Thereafter, the parts are spray-rinsed clean on withdrawal from the immersion rinse with a demineralized, or distilled water spray at ambient temperature until all immersion rinse water has been removed.

Finally, all the parts are dried. The face sheets are dried by wiping with clean, commercial grade paper towels, while the core material is dried in an oven at approximately 150° F.

If the parts are not to be immediately brazed, they are wrapped in untreated paper and maintained in a low humidity atmosphere and an ambient temperature not exceeding 75° F. until the brazing operation is commenced.

Thus, the cleaning process involves the steps of degreasing with MEK, etching with sulfuric acid, water rinsing with tap water, brightening with nitric acid, water rinsing with tap water, spray rinsing with demineralized water, drying, and wrapping and maintaining the dried parts in a controlled atmosphere.

There are many chemical reactions possible between the aluminum parts and the sulfuric and nitric acid solutions. While it has not been feasible to determine with total accuracy the particular reactions which actually take place, it has been possible to outline these reactions generally. For this purpose, other elements present in the aluminum were ignored. However, it should be noted that though present in minute quantities, these elements can enter into the reaction, particularly in the formation of metal complexes. The chemical reactions are as follows:

Aluminum reacts with sulfuric acid as follows:

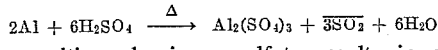

The resulting aluminum sulfate results in a black smudge appearance on the auminum surface. This will be removed in the subsequent nitric acid treatment as follows:

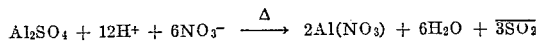

The aluminum nitrate presents no problem as it readily ionizes.

Many metal ions, including aluminum, tend to form complex ions by means of coordinate covalent bonds. One ion which is likely to form in nitric acid is an aluminum-ammonium complex: $Al(NH_3)_4^+$. This ion is a reducing agent and as such serves to inhibit to a degree the tendency of the aluminum surface to oxidize after cleaning, and it has been found, using the foregoing process, that the shelf life of the components, that is, the period of time when oxidation is insignificant, is at least 24 hours when the parts are maintained in a low humidity atmosphere.

The various aluminum parts to be brazed into a composite structure, that is the core 10 with the clad face sheets 12 and 14 and the end walls 15, are laid up in a chemically clean, stainless steel envelope 16 having rigid side walls 18 having flanges 19, a bottom wall 20, and a flexible diaphragm-type top wall 22. The height of the side walls 18 are dimensioned within given tolerances and are the thickness determinant of the composite structure. As will be seen, all of the pressure required for brazing is applied to the composite structure through the flexible diaphragm wall 22, and is controlled by the height of the side walls 18 as compared to the initial height of the composite structure prior to brazing. The entire envelope 16 is airtight except for an inlet 24 and an outlet 26. The bottom and top walls 20 and 22 are welded around their entire periphery.

The bottom wall 20 may form a permanent part of the envelope. However, the flexible diaphragm top wall 22 is not reusable and is removable by grinding off the weldment between it and the peripheral edge of the flange 19. The remainder of the envelope is reusable for many brazements. Aluminum slip sheets 28, cleaned free of chemicals or other contaminates in the same manner as the parts to be brazed, are placed on the top and bottom of the laid-up composite structure. Cleaned aluminum getter 32 is placed at the inlet 24. While aluminum wool is illustrated as the getter, any configuration such as honeycomb is also usable so long as it provides a large surface area over which argon gas, introduced at inlet 24, may pass.

When sealed, the envelope 16 is ready for placement in the brazing tool having the required contour for the particular composite structure. This tool is of the type disclosed in aforesaid copending patent applications of Martin and Music, which patent applications are incorporated by reference herein.

Generally, the tool comprises two ceramic platens 33 and 34 contoured to the desired configuration of the composite structure. Continuous cooling ducts 36 for carrying a cooling fluid and resistance wires 38 are provided throughout each of the platens. The resistance wires 38, when supplied with electric current, provide the necessary brazing heat, while cooling fluid passing through the ducts 36 provides the necessary cooling at the appropriate times. The platens 33 and 34 are supported on refractory insulating structures 40 and 42 which in turn are supported on steel back-up structures 44 and 46. Although not shown, means are provided for vertically moving the structure 44 to accommodate various sizes of envelopes 16 and to permit the application of pressure to the envelope. This particular tooling, as described in said copending applications, has particular utility in performing the processes of the invention because it is peculiarly well adapted to supply the necessary heat and coolants with extreme precision. Other forms of tooling, having the same capabilities, are, however, also within the scope of this invention.

When the envelope 16 with the composite structure therein is placed in the tool, thermocouples (not shown) are welded to the top and bottom walls of the envelope 16. Thermocouple spacer sheets 48, provided with grooved areas for housing the thermocouples, are placed on top of and under the envelope 16. The spacer sheets may be made of copper or aluminum and are used to avoid air gaps between the walls of the envelope and the tool due to the thermocouples. The thermocouples are connected to meters (not shown) for measuring the temperature of the envelope 16.

Copper heat sink sheets 50 are placed on top of and under the thermocouple spacer sheets, and a layer of refrasil 52, a non-metallic cushion, is placed between the ceramic platens 33 and 34 and the adjacent heat sink sheets 50. The copper heat sink sheets 50 distribute the heat uniformly to the work package. These sheets are used only for extremely critical temperature control applications, or to lower risk of non-uniform temperatures.

The space surrounding the envelope 16 and the various tooling sheets is then filled with insulating material 52 to limit the escape of heat from the tool.

The sealed envelope 16 is then evacuated at the outlet 26 and is purged with argon, introduced at the inlet 24 at less than atmospheric pressure, until the atmosphere within the envelope is entirely inert. The argon gas may be obtained from liquidated argon or high purity gas, but any impurities remaining in the argon are removed by the aluminum getter 32.

The ceramic platen 33 is then lowered to bring additional pressure against the parts to be brazed. It will be noted that the brazing pressure is applied to the parts to be brazed solely through the flexible diaphragm wall 22 by atmospheric pressure and by the pressure of the tool. This is because, in laying up the parts to be brazed, the height of the composite structure plus the slip sheets is made just slightly greater than the height of the rigid end walls 18 of the envelope 16. Therefore, when the platen 33 is lowered, it compresses the composite structure through the diaphragm wall 22 until such time as the weight of the platen is absorbed by the side walls 18. By means of this technique the pressure applied to the composite structure to be brazed can be precisely controlled by the tolerances built into the various parts.

After the envelope 16 has been evacuated and refilled with argon gas with the envelope below atmospheric pressure, the heating cycle is begun. The heat is gradually raised while maintaining the flow of the argon purge. After the critical brazing temperature has been maintained for the required length of time, the envelope with its contents is cooled to ambient temperature with compressed air passed through the cooling ducts 36.

The particular temperatures, pressures, and times employed in the performance of this process will vary in accordance with the particular characteristics of the material to be brazed. In a brazing cycle for aluminum alloy Types 6061, 6951, 3003, and X7005, using Type 716 cladding or Type 718 filler sheets, the following brazing cycle was followed during actual reductions to practice of this invention:

(1) The envelope 16 was evacuated for 60 minutes.

(2) Using static vacuum, the envelope 16 was checked for leaks for 30 minutes. The maximum allowable leak rate was .03 inch of mercury per hour.

(3) The envelope 16 was continuously evacuated for 90 minutes, back-filling with argon gas to a slight positive pressure every 5 minutes.

(4) Heating was begun with the envelope 16 under 8 inches of mercury vacuum and with continuous argon purge of 10 cubic feet per hour.

(5) At 350° F. ±10° the vacuum was reduced to 5 inches of mercury with the argon purge maintained at 10 cubic feet per hour.

(6) At 650° F. the vacuum in the envelope 16 was reduced to 4 inches while maintaining the argon purge at 10 cubic feet per hour.

(7) At 965° F. ±10° the electrical current applied to the resistance heating elements 38 was reduced to decrease the rate of approach to the final brazing temperature.

(8) At 1065° F. the electrical current applied to the resistance heating elements was reduced to the final setting to prevent override of the brazing temperature.

(9) Brazing was accomplished at 1085° F. ±10° in 4 minutes.

(10) The envelope was cooled to ambient temperature with compressed air applied through the cooling ducts in the platen.

For information concerning the composition and properties of the various aluminum materials, including fillers, reference may be made to the Alcoa Aluminum Handbook, published by the Aluminum Corporation of America, Pittsburgh, Pa., in 1959. The stainless steel envelope 16 and the thermocouple sheets 48 were made of Type 321 steel or equivalent. The copper heat sink sheets 50 were made of Type OFHC copper. The aluminum slip sheets used had a melting point above 1125° F., while the aluminum tooling core used had a melting point above 1150° F.

Various modifications and adaptations of this invention will be readily apparent to persons skilled in the art. For example, while the illustrated tooling has been oriented for the vertical application of pressure, and while the stainless steel envelope has been shown with a top diaphragm-type wall, it appears clear that for particular applications these arrangements may be varied to suit particular purposes. Moreover, it is intended that the invention not be limited to the brazing of any of the illustrative parent or filler materials but may be used with any aluminum or aluminum alloy materials having appropriate melting-point ranges of temperature.

Having described a preferred embodiment of the invention, I claim:

1. In a system of brazing without the use of fluxes the joints between aluminum parts with a brazing aluminum filler to form a composite brazed structure, said parts and said filler being coated with an undesirable aluminum oxide film, the method of cleaning said parts and said filler of said aluminum oxide film comprising the steps of:

(a) degreasing said parts and said filler with a solvent;

(b) drying said parts and said filler of said solvent;

(c) immersing said parts and said filler in a mildly agitated solution of sulfuric acid and water maintained at approximately 150° F., said solution containing approximately 35% by volume 66° Bé., sulfuric acid;

(d) immersing said parts and said filler in overflowing tap water at ambient temperature for approximately one minute;

(e) immersing said parts and said filler for approximately one minute in a mildly agitated solution of nitric acid and water maintained at ambient temperature, said nitric acid solution containing approximately 50% by volume 42° Bé., nitric acid;

(f) immersing said parts and said filler in overflowing tap water at ambient temperature for approximately one minute;

(g) spray rinsing said parts and said filler with demineralized water at ambient temperature until immersion rinse water is removed;

(h) drying said parts and said filler of water; and (i) maintaining the same under low humidity conditions at room temperatures prior to brazing.

2. The method of brazing, without the use of fluxes, the joints between aluminum parts with a brazing aluminum filler to form a composite brazed structure, said filler having a melting point lower than said aluminum parts, said parts and said filler being coated with an undesirable aluminum oxide film, the steps of:

(a) degreasing said parts and said filler with a solvent;

(b) drying said parts and said filler of said solvent;

(c) immersing said parts and said filler in a mildly agitated solution of sulfuric acid and water maintained at approximately 150° F., said solution containing approximately 35% by volume 66° Bé., sulfuric acid;

(d) immersing said parts and said filler in over-flowing tap water at ambient temperature for approximately one minute;

(e) immersing said parts and said filler for approximately one minute in a mildly agitated solution of nitric acid and water maintained at ambient temperature, said nitric acid solution containing approximately 50% by volume 42° Bé., nitric acid;

(f) immersing said parts and said filler in overflowing tap water at ambient temperature for approximately one minute;

(g) spray rinsing said parts and said filler with demineralized water at ambient temperature until immersion rinse water is removed;

(h) drying said parts and said filler of water;
(i) inserting said parts and said filler in an inert atmosphere;
(j) applying pressure to the joints between said parts;
(k) gradually heating said parts and said filler to the melting point of said filler; and
(l) cooling said parts and said filler;
whereby the joints between said parts are brazed.

References Cited

UNITED STATES PATENTS

| | | | |
|---|---|---|---|
| 2,834,102 | 5/1958 | Pflumm | 29—497.5 X |
| 2,837,818 | 6/1958 | Storchheim | 29—504 X |
| 2,907,105 | 10/1959 | Ohmi | 29—504 X |
| 2,916,815 | 12/1959 | Donkervoort | 29—504 |
| 2,987,816 | 6/1961 | Noland | 29—501 X |
| 3,063,145 | 11/1962 | Bouton | 29—504 X |
| 3,070,880 | 1/1963 | Davis | 29—498 X |
| 3,081,534 | 3/1963 | Bredzs | 29—494 |
| 3,112,388 | 11/1963 | Wiant. | |
| 3,180,022 | 4/1965 | Briggs | 29—487 |
| 3,235,959 | 2/1966 | Bartoszak | 29—504 X |

FOREIGN PATENTS

| | | |
|---|---|---|
| 623,209 | 12/1961 | Canada. |
| 939,871 | 10/1963 | Great Britain. |

OTHER REFERENCES

Handbook of Aluminum, pp. 137–138, 1957 copyright, Canada, Aluminum Company of Canada Ltd., Patent Office Scientific Library, TN 693–A5 A4h C.2.

JOHN F. CAMPBELL, *Primary Examiner.*

R. F. DROPKIN, *Assistant Examiner.*